United States Patent [19]

Pinto

[11] Patent Number: 4,647,467
[45] Date of Patent: Mar. 3, 1987

[54] APPARATUS AND PROCESS FOR COEXTRUDING A FAT AND A DOUGH

[75] Inventor: Albert Pinto, White Plaines, N.Y.

[73] Assignee: Nabisco Brands, Inc., Parsippany, N.J.

[21] Appl. No.: 781,497

[22] Filed: Sep. 30, 1985

[51] Int. Cl.⁴ .................. A21C 3/04; A21C 11/16; A21D 8/02
[52] U.S. Cl. .................. 426/502; 99/450.4; 99/450.7; 425/131.1; 425/145; 425/363; 425/377; 426/272; 426/516; 426/556; 426/601
[58] Field of Search .............. 425/133.5, 145, 131.1, 425/363, 364 R, 377; 99/485, 450.1, 450.2, 450.7; 366/71, 69, 76; 426/496, 502, 504, 512, 516, 556, 601

[56] References Cited

U.S. PATENT DOCUMENTS

| | | | |
|---|---|---|---|
| 2,982,231 | 5/1961 | Fries | 425/131.1 |
| 3,314,381 | 4/1967 | Fries et al. | 425/131.1 |
| 4,329,133 | 5/1982 | Gallizia | 425/131.1 |
| 4,521,359 | 6/1985 | Tsien et al. | 425/131.1 |
| 4,539,169 | 9/1985 | Nixon et al. | 425/131.1 |
| 4,574,690 | 3/1986 | Chiao et al. | 425/131.1 |

Primary Examiner—Willard E. Hoag
Attorney, Agent, or Firm—Richard Kornutik

[57] ABSTRACT

A flat sheet comprising a layer of fat sandwiched between two layers of dough is produced using a coextrusion die having two slot-like orifices. In order to avoid distortion of the sheet due to the dough leaving the center portion of the outer slot-like orifice more quickly than the end portions thereof, multiple augers or other drive means are used and the drive means which drive the dough through the end portions of the orifice operate more quickly than those which drive the dough through the center portion of the orifice. The coextruded sheet may be laminated, rolled and cut to form multi-layered bakery products.

20 Claims, 9 Drawing Figures

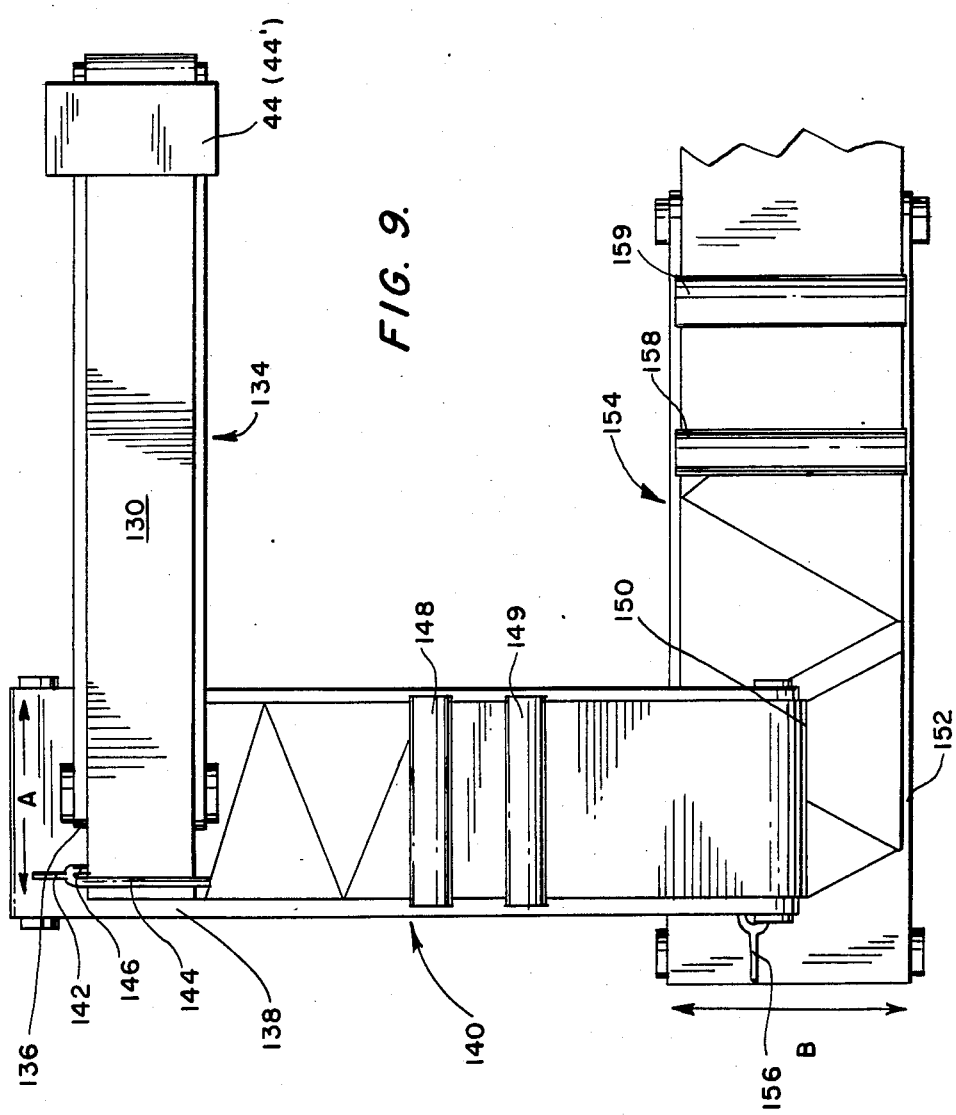

APPARATUS AND PROCESS FOR COEXTRUDING A FAT AND A DOUGH

FIELD OF THE INVENTION

This invention relates to an apparatus and process for coextruding a fat and a dough. More specifically, this invention relates to such an apparatus and process which permit coextrusion of the fat and dough in the form of a flat sheet.

BACKGROUND OF THE INVENTION

Puff pastry and other laminated edible products have long been produced by processes which involve first forming a composite sheet in which one or more layers of fat (a term which is used herein to cover both fats which are solid at room temperature and those which are liquid at room temperature, the later normally being designated "oils") are sandwiched between layers of dough. This composite sheet is then laminated, that is to say a plurality of plies of the sheet are piled up on top of one another. Following this initial lamination, the laminated sheet is usually rolled to reduce its thickness, and then subjected to a second lamination. After this second lamination, the sheet is cut to the desired shapes and backed to produce an article comprised of a large number of very thin layers of the dough.

A variety of apparatus and processes are known for performing the operations of sheet formation, lamination and rolling used in such a process. For example, U.S. Pat. No. 3,151,987 to Colby discloses a method of making pastry and similar products in which flour and water are mixed to produce an extensible paste which is extruded into a sheet. Plastic shortening is applied to the sheet and the process is repeated to form a pile of sheets, which is then compressed to produce the final product.

U.S. Pat. No. 3,821,452 to Hayashi describes a process for producing multi-layered food products such as pies, danish pastries and sweet rolls. This process comprises forming spherical particles in which fat is enrobed by dough, feeding these particles one at a time on to a movable plate and flattening each particle individually, using a vertically oscillating platen, to form a pile of multiple layers. This pile is then moved to pinch rolls to reduce its thickness and to produce the final multi-layered product.

U.S. Pat. No. 4,453,906 to Hayashi describes a process for forming a continuous sheet of dough in which a mass of dough is held in a container, the bottom of which is closed by a conveyor. Movement of the conveyor causes a sheet of dough to be extruded through a slot between a cutter fixed to one wall of the container and the upper surface of the conveyor. The patent does not describe any way in which the process could be used for coextrusion of fat and dough, and it appears that the process could not be adapted to such coextrusion.

U.S. Pat. No. 1,975,326 to Loose et al describes a continuous sheeting and laminating process for producing crackers, in which dough is formed into a plurality of sheets by rollers, then layers of creams, fats, or mastics are spread onto the individual layers of dough and the layers of dough are piled on top of one another and passed between a second set of rollers. Thereafter, the combined multi-layered product is passed vertically downwardly between a third set of rollers into an oscillating frame which oscillates transversely across a conveyor, thereby depositing multiple layers of the product onto the conveyor. While on the conveyor, the resultant multi-layered sheet is passed between a pair of rollers which reduce the thickness of the sheet. Upon leaving the conveyor, the sheet passes downwardly between a further pair of rollers and through a second oscillating frame, which oscillates transversely across a second conveyor, again producing multiple plies of the multi-layered sheet upon the second conveyor. While on the second conveyor, the multiple plies are again rolled by a further pair of rollers.

U.S. Pat. No. 3,851,088 to Albrecht describes a method of laminating sheets of dough in which a sheet is passed through a pendulum assembly which oscillates transversely across a conveyor. The portion of the conveyor lying beneath the pendulum assembly is formed into a concave shape in order to keep the distance between the discharge end of the pendulum assembly and the conveyor constant. The oscillation of the pendulum assembly and the movement of the conveyor cause multiple plies of the sheet to be deposited on to the conveyor.

U.S. Pat. No. 1,868,317 to Green et al describes a process for laminating dough in which dough is fed from the end of a first conveyor, the discharge end of which passes around a roller, downwardly onto a second conveyor running at right angles to the first. An elaborate drive mechanism allows reciprocation of the roller at the discharge end of the first conveyor without tearing the dough, so that the sheet of dough falling from the first conveyor onto the second conveyor oscillates transversely across the second conveyor, so forming multiple plies of the sheet of dough on the second conveyor.

U.S. Pat. No. 2,823,625 to Oakes describes a method of laminating dough in which a sheet of dough is advanced endwise, the leading portion of the sheet is alternately stopped and advanced at a higher rate than the remainder of the sheet, the leading portion of the sheet is repeatedly cut off to produce a succession of smaller sheets and then these smaller sheets are deposited onto a second conveyor moving at right angles to the first with a large overlap between successive sheets, so producing multiple plies of the sheet on the second conveyor.

U.S. Pat. No. 4,113,412 to Hayashi describes a method of rolling dough using an assembly of rollers mounted on an endless belt which causes the axes of the rollers to move in the same direction as the dough, while the rollers rotate about their own axes such that the surfaces of the rollers in contact with the dough are moving in the opposite direction to the dough itself. An elaborate drive mechanism is provided for positively controlling the rate of rotation of the rollers. The rollers can effect lamination of the dough as they roll it.

U.S. Pat. No. 3,973,895 to Hayashi describes a method of rolling dough which is closely similar to that described in U.S. Pat. No. 4,113,412, but in which the roller assembly is provided with means for controlling the speed of the conveyor belt under the rollers.

U.S. Pat. No. 4,192,636 to Hayashi et al discloses another method of rolling dough which is similar to that described in the preceding patents and uses an endless belt carrying a plurality of rollers.

U.S. Pat. No. 4,056,346 to Hayashi describes a method of rolling dough in which the dough is first rolled by a multiple roller assembly of the same types as disclosed in the three preceding patents. However, in U.S. Pat. No. 4,056,346 the dough, after leaving the multiple roller assembly, passes under an additional roller which does not stretch the dough but limits the contraction of the dough which would otherwise occur due to its resiliency.

U.S. Pat. No. 4,178,147 to Hayashi discloses a method of stretching dough using a multiple roller assembly similar to that of U.S. Pat. No. 4,113,412 and other Hayashi patents discussed above. However, in U.S. Pat. No. 4,178,147 the conveyor belt lying beneath the multiple roller assembly in U.S. Pat. No. 4,113,412 is replaced by a series of rollers which are rotated to carry the dough in the desired direction. The resultant structure includes pairs of adjacent rollers on either side of the side, these pairs of rollers rotating in opposed directions.

The sheet formation stage of the multi-stage process used to produce puffed pastry and other laminated products is attended with serious difficulties. Because of the reduction in area of the sheet effected by the laminations, the sheet must be formed at a very high rate to allow modern commercial lamination, rolling and cutting equipment to operate at its optimum speed. On the other hand, since it is desired to produce a final laminated product containing a large number of very thin layers of dough, it is desirable that the sheet initially formed be thin, and it is difficult to form sufficiently thin layers of fat and dough having the necessary uniformity, especially since a relatively wide sheet, typically 14-50 cm. wide, is desired. The combination of the large width of the sheet and the thinness of the layers renders the sheet highly vulnerable to rupturing and tearing as it is formed and, if any tearing of the sheet occurs, leakage of the fat from the sheet may result, with costly interruptions to production, excessive scrap and possibly damage to processing machinery.

All the prior art techniques for sheet formation have serious disadvantages. The technique involved in U.S. Pat. No. 3,151,987, in which plastic shortening is applied to a sheet of paste, is difficult to operate at high speeds without using multiple dispensers for the paste and the plastic shortening, and thus the apparatus required tends to be elaborate and costly. In addition, it is difficult when using such multiple shortening dispensers to achieve uniformity and thickness in the multiple layers of paste and shortening, and because the shortening layers are exposed at the edges of the sheet there is a serious risk of leakage of shortening during the lamination and rolling stages of the process. The process described in U.S. Pat. No. 3,821,452, in which spherical particles comprising a fat center enrobed by a dough layer are flattened, is difficult to operate at sufficient speeds, tends to produce non-uniform layers of fat because of the way in which the spherical particle is stretched during flattening, and may result in leakage of the fat, especially if the platen is being operated at high speed. The process disclosed in U.S. Pat. No. 1,975,326 suffers from the same disadvantages as that disclosed in U.S. Pat. No. 3,151,987.

It might appear that one method for producing the necessary sheet of fat and dough at high speed would be coextrusion of fat and dough. and methods for such coextrusion are known. For example, U.S. Pat. Nos. 4,113,819, 4,266,920 and 4,416,910, all to Hayashi, describe apparatus and processes for manufacturing multi-layered dough materials comprising layers of dough and fat or oil, such as butter. These processes involve coextrusion of dough and fat through a die having concentric annular orifices to form a hollow tube in which an inner layer of fat is surrounded by an outer layer of dough. In U.S. Pat. Nos. 4,412,819 and 4,416,910, this tube is then collapsed under its own weight on to a first conveyor, which passes it under a rolling assembly comprising a plurality of rolls which are themselves carried around an endless belt. At the end of the first conveyor, the rolled sheet passes downwardly to an oscillating chute, which oscillates parallel to the direction of motion of the first conveyor, and are formed into a pile, comprising multiple plies of the sheet, on a second conveyor, which conveys it under second rolling assembly generally similar to the first one already described.

In the apparatus shown in U.S. Pat. Nos. 4,113,819 and 4,416,910 both orifices of the coextrusion die are annular. The patents discussed the possibility of using a die having orifices of flattened or rectangular form, but state that, since the elevation angles of various portions of the inner faces of the nozzles are considerably different from each other because of the required changes in the cross-section of the channels used to feed material to the orifices of such a flattened die, such flattened or rectangular orifices are to be avoided because the discharge speed is different between the middle and end portions of the rectangular orifices. Such changes in discharge speed would result in non-uniformity of the thickness of the layers of fat and dough forming coextruded tube, and might result in distortion or rupture of the tube. Also, if in accordance with the teachings of these patents annular dies producing a hollow cylindrical tube are used, and if this tube is to have the diameter desirable to produce a sheet of the desired width for high-speed production, the dies required are extremely large, cumbersome and expensive to form. Moreover, it is difficult to collapse a large diameter. thin-walled coextruded tube of the relatively soft fat and dough on to a moving conveyor belt at high speed without distorting or even rupturing the tube, which again will produce non-uniformities in the product and may result in interruption of production and leakage of fat from the sheet.

U.S. Pat. No. 3,572,259 to Hayashi discloses a process in which a cylinder of dough filled with a filler is coextruded in the same manner as in U.S. Pat. No. 4,113,819, and the coextruded cylinder is thereafter formed into double-layered spheres. A similar method, not restricted to the coextrustion technique of U.S. Pat. No. 4,113,819, is disclosed in U.S. Pat. No. 3,351,026 to Hayashi. For the reasons already discussed above in relation to U.S. Pat. No. 3,821,452, processes involving formation of spherical particles in which a filler is enrobed by dough and flattening these particles to form sheets cannot be operated at sufficient production rates and may cause problems in secured a sufficiently uniform product.

There is thus a need for an apparatus and process for coextrusion of fat and dough which is capable of producing a wide sheet at high production rates and with uniform thickness of the layers of fat and dough. This invention provides such an apparatus and process.

SUMMARY OF THE INVENTION

This invention provides apparatus for coextruding a fat and a dough to produce an extruded sheet comprising a layer of the fat sandwiched between two layers of the dough. This apparatus comprises a die member with a first outlet orifice having the form of an elongate slot through which the flat can be extruded, a second outlet orifice in the form of an elongate slot surrounding the first outlet orifice and through which the dough can be extruded, and a supply conduit communicating with the second outlet orifice and through which dough can be fed to the second outlet orifice. The apparatus also comprises first, second and third drive means disposed in the supply conduit for driving the dough along the supply conduit and through the second outlet orifice, the first and third drive means being arranged to drive the dough through the two opposed end portions of the second outlet orifice, while the second drive means is arranged to drive the dough through the center portion of the second outlet orifice. Finally, the apparatus comprises control means for controlling the operation of the drive means, this control means being arranged to operate the first and third drive means at a faster rate than the second drive means, such that the dough passes through the end portions of the second outlet orifice at substantially the same rate as it passes through the center portion of this orifice.

This invention also provides a process for coextruding a fat and a dough to produce an extruded sheet comprising a layer of the fat sandwiched between two layers of the dough. In this method, the fat is fed through a die member having a first outlet orifice in the form of an elongate slot, and a second outlet orifice in the form of an elongate slot surrounding the first outlet orifice, the fat being fed through the first outlet orifice of the die member. The dough is simultaneously fed through the second outlet orifice of the die member in such a manner that the dough passes through the two end portions of the second outlet orifice at substantially the same rate as it passes through the center portion of this orifice.

BRIEF DESCRIPTION OF THE DRAWINGS

FIG. 9 is a top plan view of the lamination and rolling apparatus shown in FIG. 8.

DETAILED DESCRIPTION OF THE INVENTION

In the apparatus of the present invention, a die having elongate first and second outlet orifices is used and dough is forced through the second, outer outlet orifice via a supply conduit which has at least three drive means arranged so that two of the drive means, which are associated with the two ends of the second outlet orifice, operate faster than the drive means associated with the center portion of this orifice, so that the dough passes through the two end portions of the second outlet orifice at substantially the same rate as it passes through the center portion of this orifice. Although reference has been made above to a die member having a supply conduit communicating with the second outlet orifice, and first, second and third drive means disposed in the supply conduit, the apparatus of the invention is not limited to apparatus in which the outlet orifice and the drive means are present in a single unit. In practice, to allow flexibility of operation and variation of the width and thickness of the sheet of fat and dough, it will usually be more convenient to form the apparatus of the invention in two separate parts, one part being a die in which are formed the two outlet orifices and the terminal portion of the supply conduit adjacent the second outlet orifice, and the other part being a supply section which contains the drive means disposed in a supply conduit which, when the two parts of the apparatus are assembled, communicates with the supply conduit in the die. Since the supply section of such an apparatus is normally by far the larger and more costly part of the apparatus, the die can be arranged so that it can easily be dismounted from the supply section and replaced with other die members of differing shapes, thereby enabling a single supply section to be used to form a plurality of different sheets of fat and dough.

Figure 1:
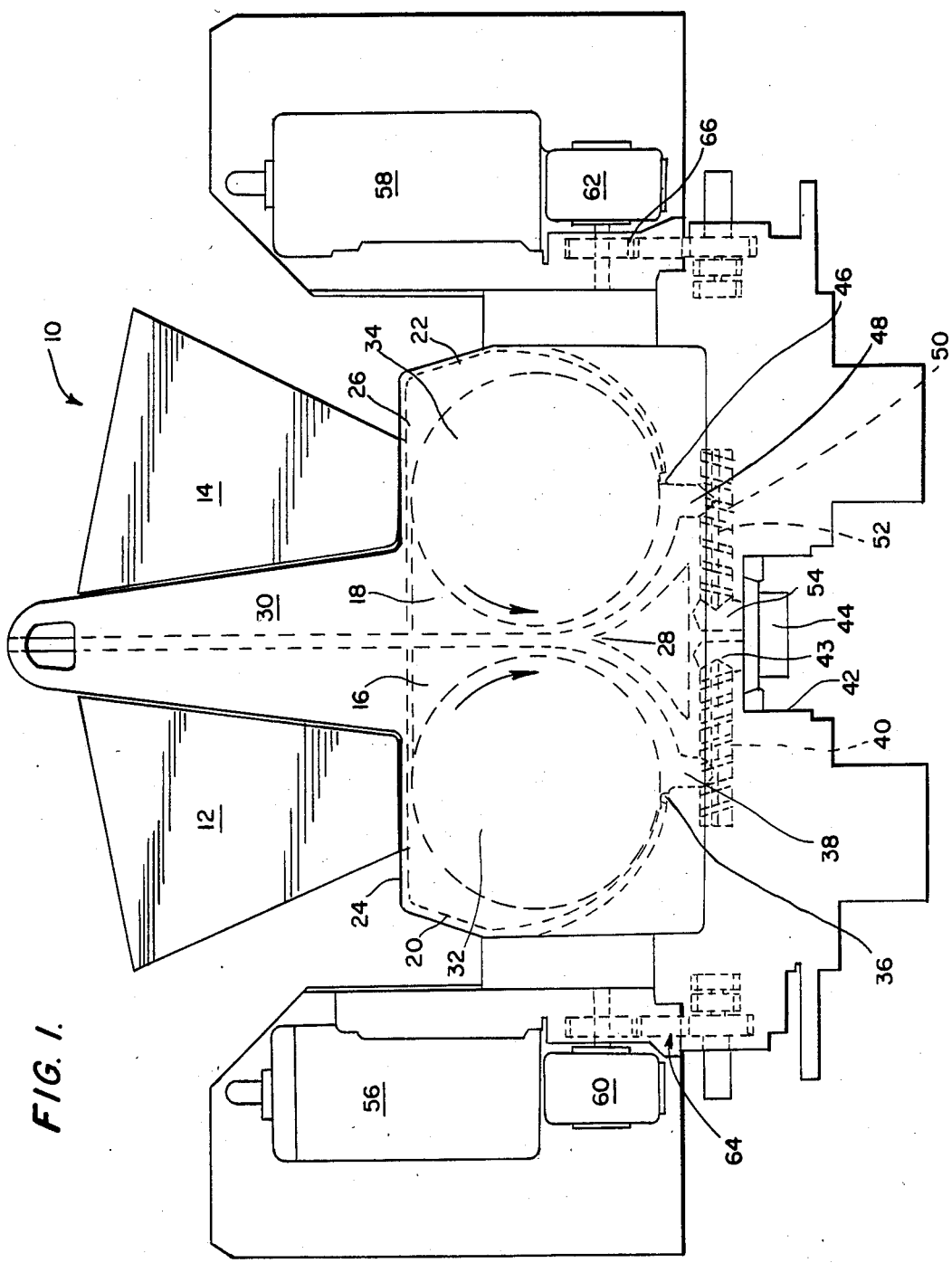
FIG. 1 is an end elevation of an apparatus of the invention.

As shown in FIG. 1, an apparatus of the present invention (generally designated 10) comprises two hoppers 12 and 14 into which are placed the fat and dough respectively which are to be coextruded. The hoppers 12 and 14 have the form of elongate trapezoidal prisms, the axes of these prisms being perpendicular to the plane of FIG. 1. The hoppers 12 and 14 are carried by central support members (not shown). Each of the hoppers 12 and 14 has a slot in its lower face through which the fat or dough contained in the hopper flows downwardly into a substantially hemi-cylindrical chamber 16 or 18 respectively. The chambers 16 are enclosed by curved outer walls 20 and 22 respectively, flat upper walls 24 and 26 respectively and a central divider 28, the lower portion of which can be seen more clearly in FIG. 3. The ends of the chambers 16 and 18 are closed by end plates, only one end plate 30 being visible in FIG. 1.

The chambers 16 and 18 contain rotatable drums 32 and 34 respectively. The drums 32 and 34 rotate in opposed directions, as shown by the arrows in FIG. 1, so that the surface of each drum adjacent the divider 28 is moving downwardly. As the fat and dough emerge from the hoppers 12 and 14 respectively via the slots in the bases of these hoppers, they fall onto the surfaces of the drums 32 and 34 and are carried by the rotating drums to the lower portions of the chambers 16 and 18 respectively. The lowest portion of the surface of the drum 32 is in contact with a doctor blade 36 which detaches the layer of fat from the drum 32 and causes the fat to drop down a vertical conduit 38. The base of the vertical conduit 38 communicates with a series of parallel horizontal conduits 40, in which are disposed auxiliary drive means in the form of augers 42 (see FIG. 3). The augers 42 convey the fat along the horizontal conduit 40 from the vertical conduit 38 to a second vertical conduit 43, down which the fat passes to a die 44. The whole apparatus apart from the die 44 comprises the supply section.

Similarly, the dough emerging from the hopper 14 is carried by the rotating drum 34 downwardly through the chamber 18 until a point at which a doctor blade 46 is in contact with the surface of the drum 34. The doctor blade 46 serves to attach the dough from the drum 34, thereby causing the dough to drop down a vertical conduit 48 into a horizontal conduit 50 equipped with drive means in the form of augers 52, which convey the dough along the horizontal conduit 50 from the vertical conduit 48 to a second vertical conduit 54 which communicates with the die 44.

The augers 42 and 44 are driven by variable speed electric motors 56 and 58 via gear boxes 60 and 62 respectively and gear trains, generally designated 64 and 66 respectively. The variable speed controls (not shown) of the motors 56 and 58, together with the gear boxes 60 and 62 and the gear trains 64 and 66, comprise the control means of the apparatus. The operation of the gear boxes 60 and 62 and the gear trains 64 and 66 is described in more detail below with reference to FIGS. 2 and 3.

Figure 2:
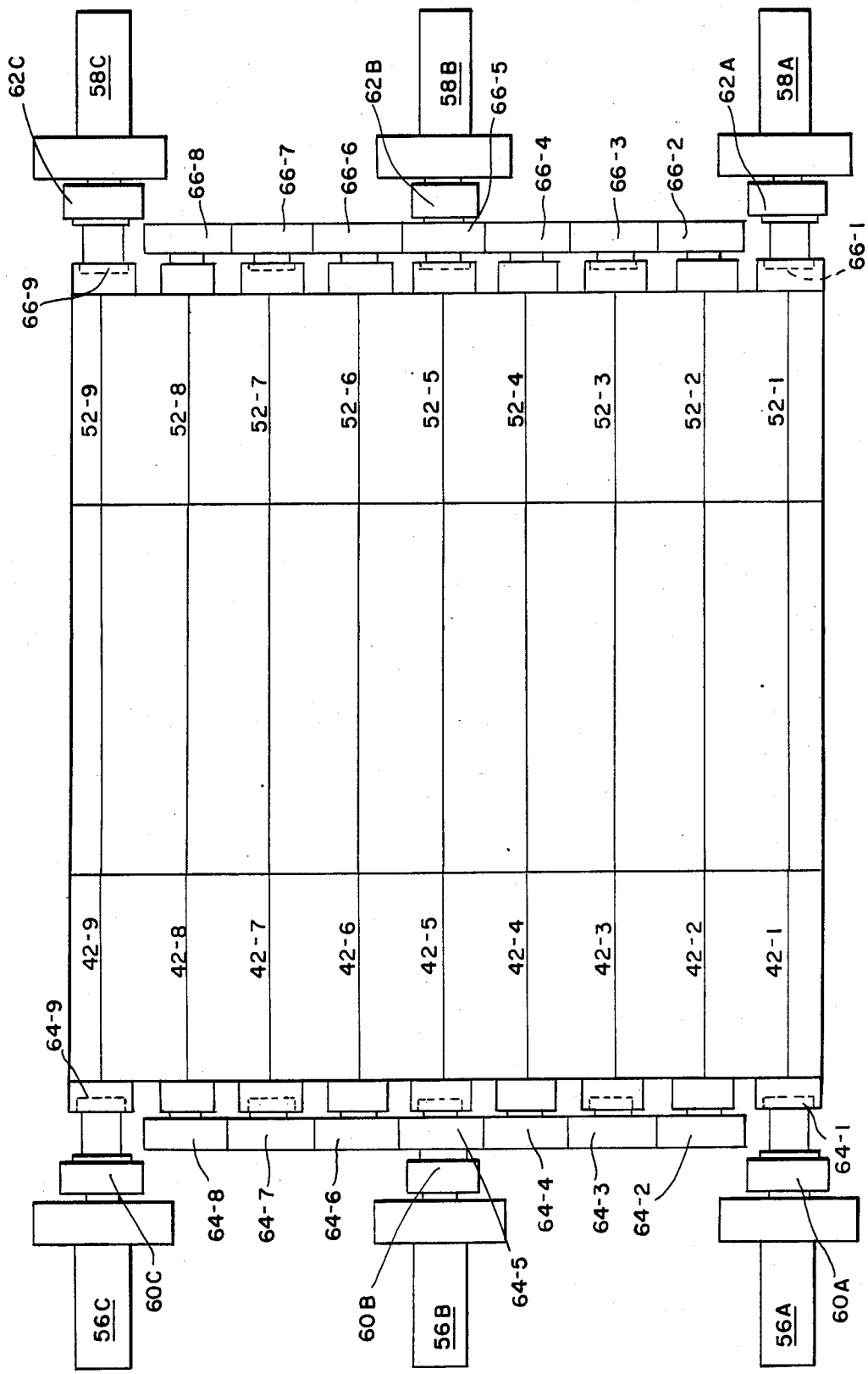
FIG. 2 is a highly schematic top plan view of the apparatus shown in FIG. 1, and shows the motor and transmission assembly used to drive the drive means of the apparatus.

Because FIG. 1 is a transverse section through the apparatus, only one auger 42, one auger 52 and the associated motors 56, 58, gear boxes 60, 62 and gear trains 64, 66 are visible in FIG. 1. However, as illustrated in a highly schematic manner in FIG. 2, the apparatus 10 actually comprises nine separate augers 42, designated 42-1 to 42-9, and similarly nine separate augers 52, designated 52-1 to 52-9; for simplicity, only the axes of the augers are indicated in FIG. 2. In order to avoid the complexity and expense of providing each auger with a separate electric motor, the apparatus is arranged so that each set of nine augers is driven by only three separate electric motors, designated 56A-C and 58A-C. Each of the motors 56A-56C and 58A-58C drives a single gear box, the gear boxes being designated 60A-60C and 62A-62C.

Each of the two sets of nine augers has a separate gear train associated therewith, these gear trains being designated 64-1 to 64-9 and 66-1 to 66-9. As shown in FIG. 2, motor 56A drives gear train 64-1 directly via gear box 60A, and motor 56C drives gear train 64-9 directly via gear box 60C. Motor 56B drives gear train 64-5 directly via gear box 60B, and gear train 64-5 in turn drives gear trains 64-2, 64-3, 64-4, 64-6, 64-7 and 64-8. This arrangement of driving mechanisms reduces the number of gear boxes required to drive the relatively large number of augers used.

Similarly, motor 58A drives gear train 66-1 directly via gear box 62A, and motor 58C drives gear train 66-9 directly via gear box 62C. Motor 58B drives gear train 66-5 directly via gear box 62B, and gear train 66-5 in turns drives gear trains 66-2, 66-3, 66-4, 66-6, 66-7, and 66-8. In order that all the augers in each set may rotate in the same direction, alternate gear trains in each set (the gear trains bearing reference numerals with odd suffices) are reversing gear trains.

Figure 3:
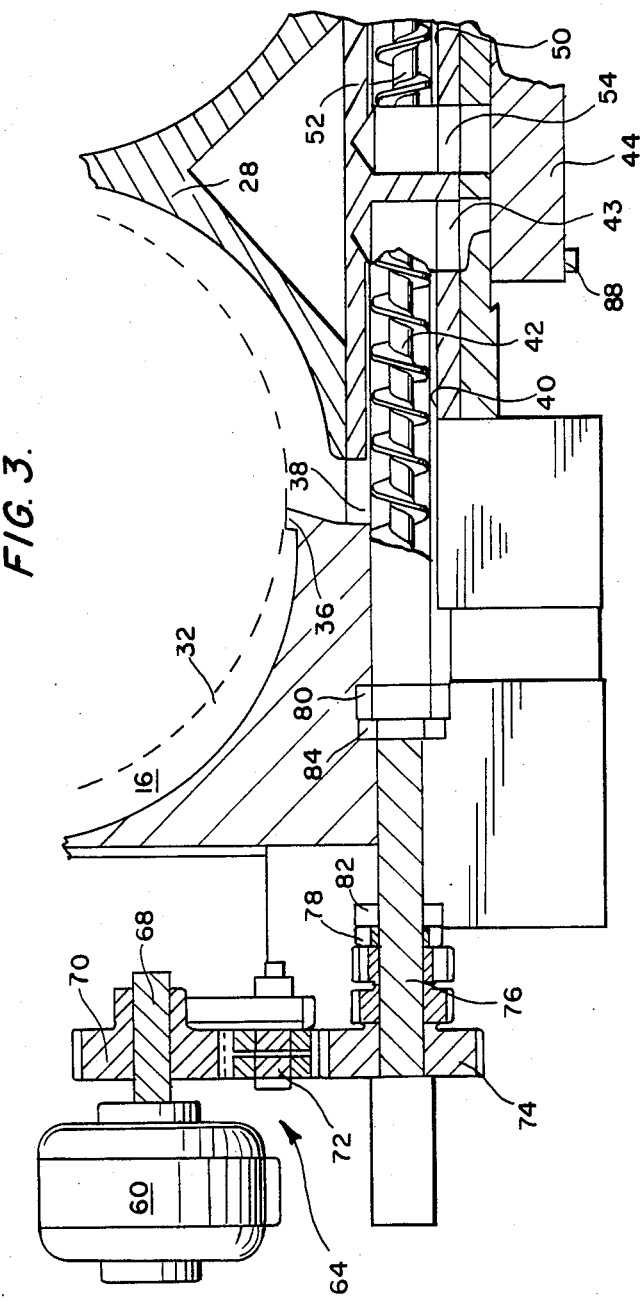
FIG. 3 is an enlarged section, taken in a plane parallel of that of FIG. 1, through part of the apparatus shown in FIGS. 1 and 2, and shows the drive means of the apparatus and its spatial relationship to the die.

FIG. 3 shows in more detail the gear box 60, the gear train 64 and the augers 42 and 52 shown in FIG. 1. As shown in FIG. 3, the gear box 60 carries a shaft 68 on which is mounted a gear wheel 70, which forms part of the gear train 64. The gear 70 drives an idler gear 72, which in turn drives a gear wheel 74. The gear wheel 74 is mounted on a shaft 76 provided with seals 78 and 80 and bearings 82 and 84. The shaft 76 is integral with the auger 42 and thus serves to drive the aeuger.

As explained above, the auger 42, which comprises part of the auxiliary drive means of the apparatus, rotates within a cylindrical conduit or bore 40 (a separate bore 40 being provided for each auger 42) and serves to transport the fat passing down the vertical conduit 38 horizontally along the conduit 40 to a substantially rectangular second vertical conduit 43, a separate conduit 43 being associated with each bore 40. The lower end of conduit 43 terminates in an elongate aperture (not shown), the long axis of this aperture being perpendicular to the plane of FIG. 3. Each of the conduits 43 has a separate aperture at its lower end, these apertures being arranged so that the long axes of the apertures are in alignment. Similarly, the vertical conduits 54 associated with the augers 52 each terminate in elongate apertures (not shown) all of having their long axes aligned with one another.

Figure 4:
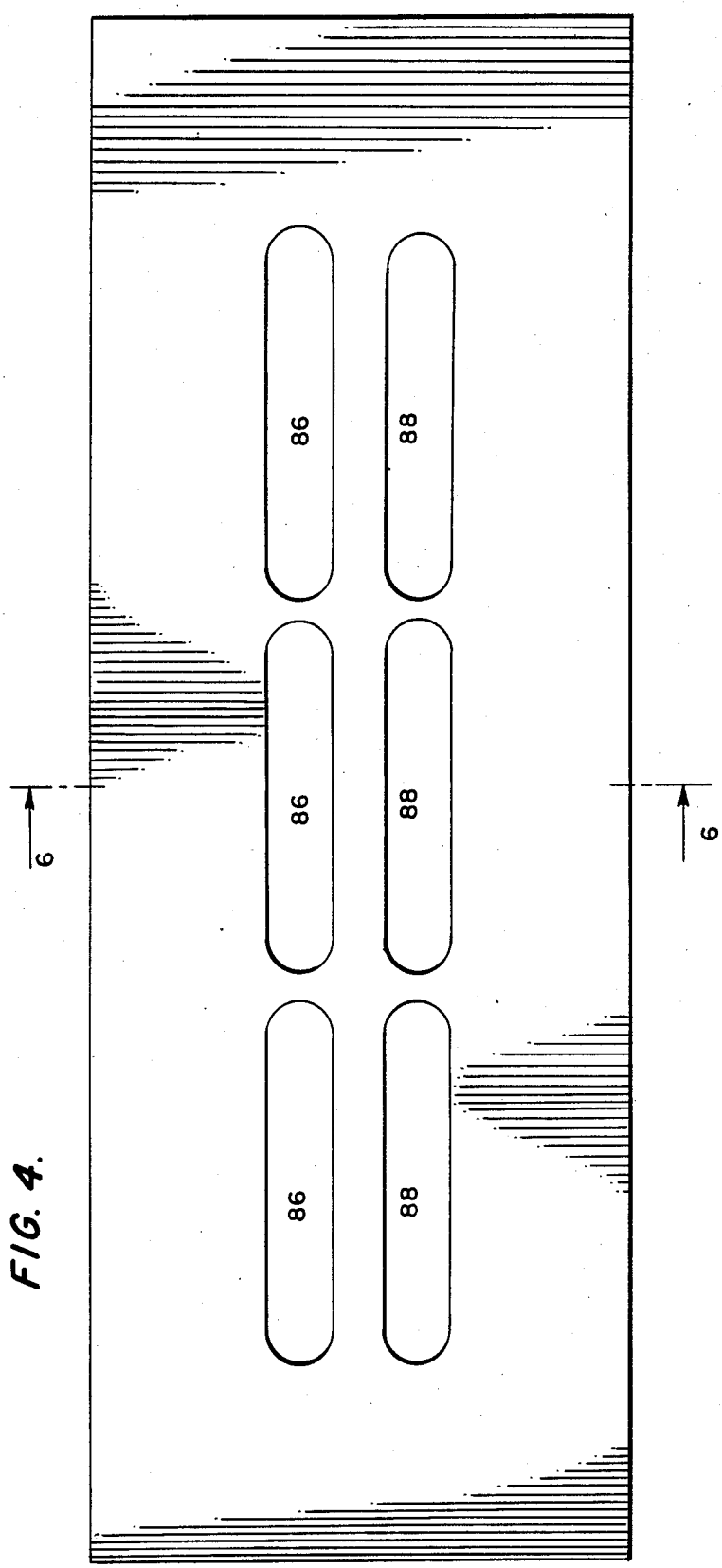
FIG. 4 is a top plan view of the die shown in FIGS. 1 and 3.

As best seen in FIG. 4, the upper surface of the die 44 is provided with two elongate apertures 86 and 88, both having their long axes parallel to the length of the die 44. The aperture 88, which extends across the longitudinal plane of symmetry of the die 44, communicates with the apertures at the lower ends of the vertical conduits 43. Similarly, the aperture 86 communicates with the apertures at the lower ends of the vertical conduits 54. Proper alignment between the apertures on the die 44 and the conduits 43 and 54 is maintained by bolts 88 (one of which is visible in FIG. 3) which pass through bores in the die 44 and engage threaded apertures provided in the base of the lower surface of the supply section of the apparatus 10, in a manner which will be familiar to those skilled in the art of mechanical engineering.

Figure 5:
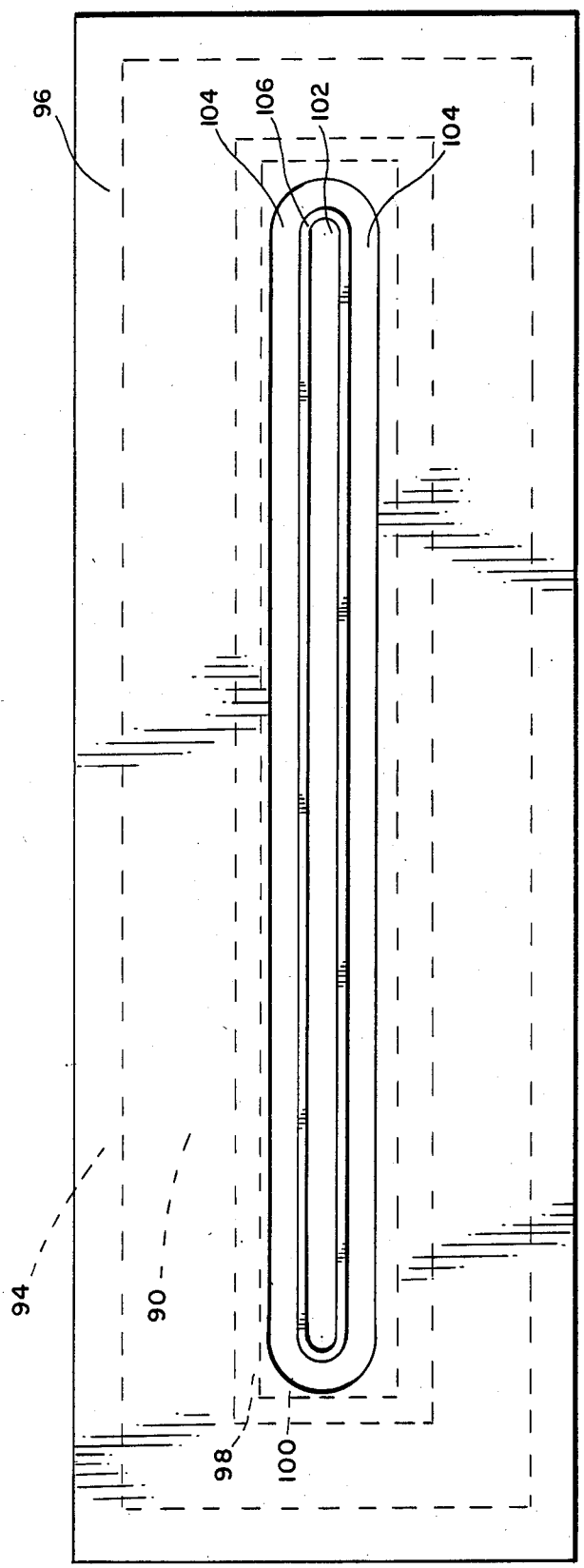
FIG. 5 is a bottom plan view of the die shown in FIGS. 1, 3 and 4.
Figure 6:
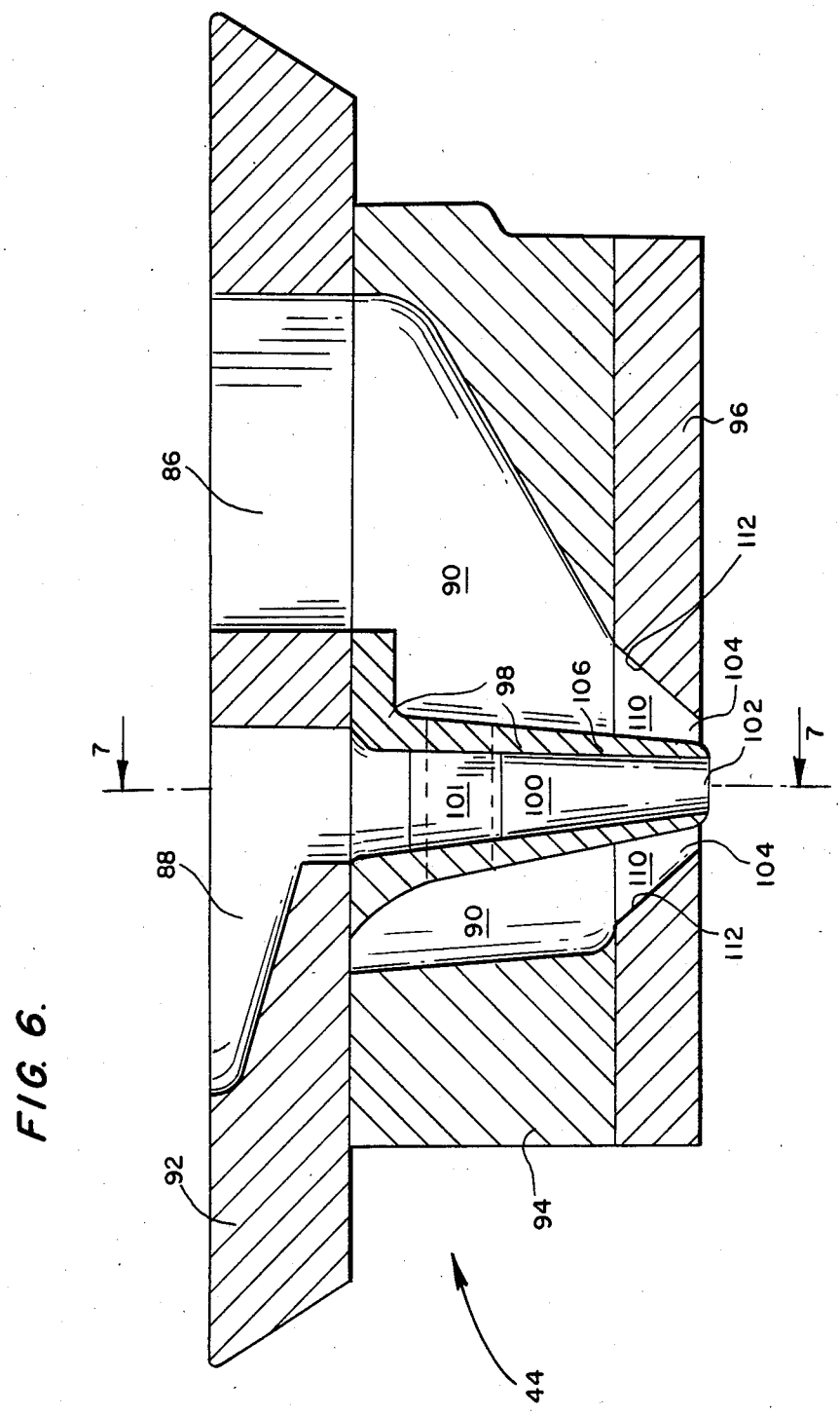
FIG. 6 is a section along the line 6—6 in FIG. 4.
Figure 7:
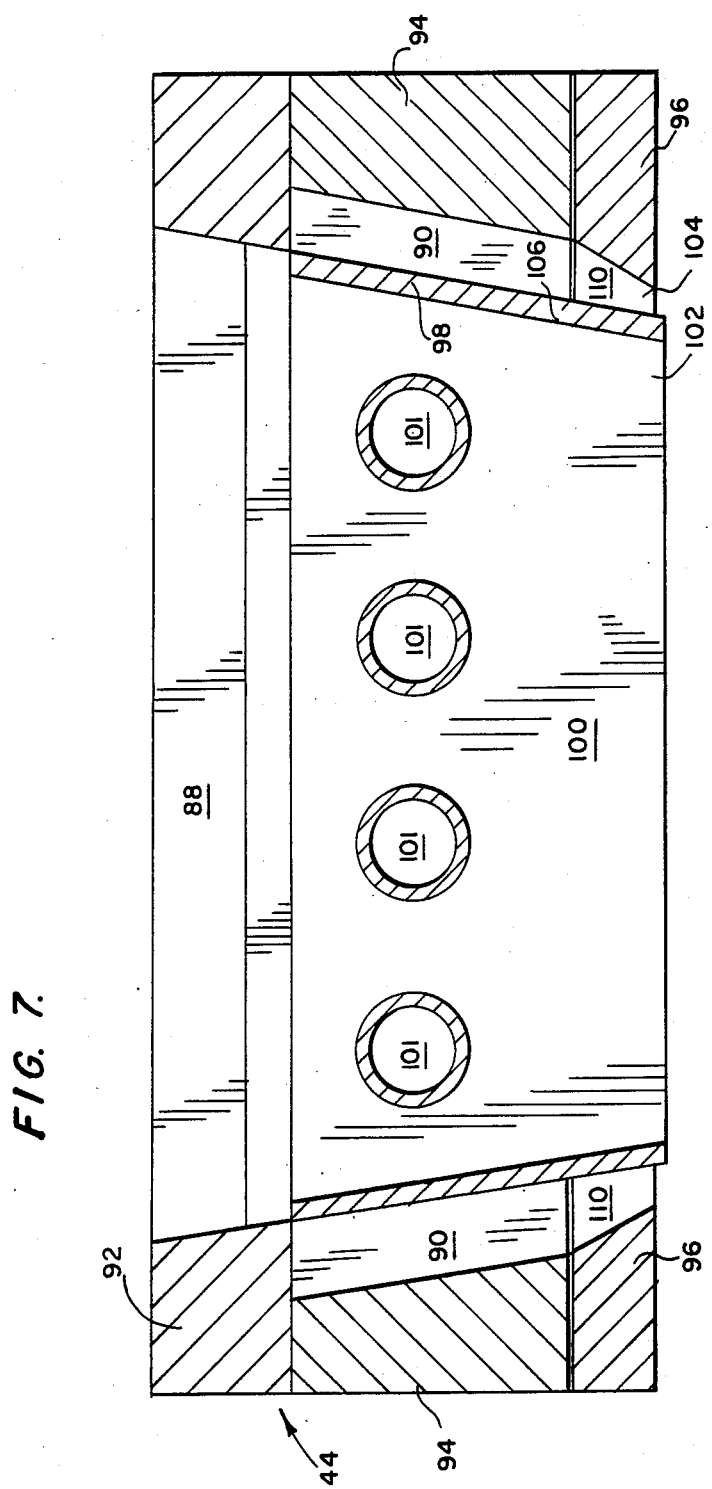
FIG. 7 is a section along the line 7—7 in FIG. 6.

The construction of the die 44 is best seen in FIGS. 5, 6 and 7. As shown in those Figures, the apertures 86, through which the dough enters the die, communicates with a dough plenum 90. This dough plenum extends substantially the full length of the die 44. The dough plenum 90 is bounded by the rear wall 92, the side walls 94 and the front wall 96 of the die 44 and by a center member 98. (The front wall 96, the side walls 94 and the center member 98 are held together and fastened to the rear wall 92 by bolts (not shown) in order that the die 44 can be disassembled for cleaning and similar purposes.) As shown in FIG. 5, although the aperture 86 is disposed to one side of the central vertical plane of symmetry of the die 44, the dough plenum 90 extends on both sides of the center member 98.

The aperture 88 through which the fat enters the die 44 similarly communicates with a single fat plenum 100 enclosed within the central member 98. The fat plenum 100 extends substantially the full length of the die 44 but is slightly shorter in length than the dough pleunum 90 in order to allow the dough plenum 90 to feed dough to the ends of the second outlet orifice of the die 44, as described in more detail below. Moreover, the center member 98 is provided with a plurality of passages 101 (best seen in FIG. 7) which extend transversely across the portion of the center member 98 adjacent the rear wall 92. The passages 101, which are spaced at regular intervals along the length of the center member 98, establish communication between the two halves of the dough plenum 90 lying on opposite sides of the center member 98.

The front wall 96 and the central member 98 of the die 44 define a first outlet orifice 102 having the form of an elongate slot defined by the downward end of the central member 98 and communicating with the fat plenum 100 so that fat entering the fat plenum 100 can be extruded through the first orifice 102. The central member 98 and the front wall 96 also define a second outlet orifice 104 in the form of an elongate slot surrounding the first outlet orifice, so as to produce a sheet in which the fat is completely surrounded by the dough, thereby reducing the risk of fat leaking from the sheet during later processing. As shown in FIG. 5, at the ends of the die 44 the second orifice 104 is continued around the ends of the central member 98 so that the second orifice 104 completely surrounds the first orifice 102. The central member 98 is prismatic in shape, and its lower end has an inwardly tapering section 106 which terminates in the first orifice 102. As shown in FIG. 6, the lower end of the section of the section 106 of the central member projects outwardly beyond the lower surface of the front wall 96 and hence through the plane of the second orifice 104, so that the first and second orifice lie in substantially parallel planes but with the first orifice lying outwardly of the second orifice. This relative disposition of the first and second orifices allows the sheet of fat which emerges from the orifice 102 to flow smoothly into the center of the hollow sheet of dough which is extruded through the orifice 104 around the central member 98.

As shown in FIG. 5, the surfaces 112 of the front wall 96 which define a conduit 110 (this conduit connecting the dough plenum 90 to the second orifice 104 and hence forming the last section of the supply conduit comprised of the conduit 48, 50, 54, 86 and 110 and the dough plenum 90) are beveled so that the walls 112 are inclined towards one another so that the conduit 110 has substantially the form of a frustum of an isosceles triangular prism, the axis of which lies parallel to the length of the second orifice 104.

The dimensions of the apertures 102 and 104 may be varied depending the upon the exact physical properties of the dough and fat to be coextruded and the further operations to be performed upon the coextruded sheet of fat and dough after it leaves the die 44. However, it is preferred that the orifices 102 and 104 be highly elongate in order that a thin, relatively wide sheet of dough may be produced very suitable for lamination, rolling and further processing. More specifically, the first orifice 102 desirably has a length at least about ten times its width and that the second orifice 104 desirably has a length at least about five times its width. To provide a coextruded sheet which is sufficiently thin and flexible to be easily handled during lamination and which is wide enough to provide a high production rate, it is preferred that the first outlet orifice have a width in the range of 2 to 10 mm. and a length of at least about 200 mm. and the second outlet orifice have a width of 6 to 30 mm. and a length in excess of 200 mm. and at least 6 mm. greater than the length of the first outlet orifice.

To ensure that sufficient fat is present to provide proper separation of the dough during the lamination stages, without producing an excessively greasy product, the width of the first outlet orifice should preferably be from 0.6 to 1 times the thickness of each side of the second outlet orifice, so that the thickness of the fat layer in the sheet produced will be from 0.6 to 1 times the thickness of each of the dough layers in the sheet. For commercial production, one might, for example, use a die with a first orifice 7–8 mm. in width and having a length of 400 to 500 mm. and a second outlet orifice having a total width of 20–25 mm. and a length approximately 15 mm. longer than the first outlet orifice.

From the foregoing description of the apparatus of the invention shown in FIGS. 1–6, it will be seen that fat and dough carried from the hoppers 12 and 14 by means of the drums 16 and 18 to the vertical conduits 38 and 48 respectively is driven by the augers 42 and 52 respectively into the plena 100 and 90 respectively. The sets of augers 42 and 52 are driven by the motors 56 and the gear boxes 60 and 62 in such a way that the augers adjacent the end portions of the die 44 rotate faster than the augers in the central section of the die 44. The necessary variation of the speed of the augers can be achieved by varying the speeds of the motors 56A-C and 58A-C using the variable speed controls provided on the motors, the motors 56A and 56C being operated faster than the motor 56B, and the motors 58A and 58C faster than the motor 58B.

The increased speed of the augers 42-1, 42-9, 52-1, and 52-9 which lie adjacent the end portions of the die 44, and which are responsible for feeding the fat and dough to the end portions of the orifices 102 and 104, compensates for the increased frictional forces to which the dough and fat are subjected adjacent the ends of their respective orifices. Thus, by driving the augers at differing speeds the rates at which the fat and dough are extruded at the end portions of their respective orifices can be made the same as those at which they are extruded through the center portions of the same orifices, thereby providing a very uniform sheet which is not distorted along its side edges. The passages 101 extending through the center member 98 also assist in ensuring even flow of dough throughout the orifice 104. The passages 101 extending through the center member 98 also assist in ensuring even flow of dough throughout the orifice 104. The passages 101 permits easy flow of dough from the left-hand side (in FIG. 6) of the dough plenum 90, which is fed directly with dough via the aperture 86, to the right-hand side (in FIG. 6) of the dough plenum 90, which does not communicate directly with the aperture 86. In view of the length of the central member 98, if some means were not provided to permit ready flow of dough across the central member between the two halves of the dough plenum 90, the dough would only be able to reach the right-hand side (in FIG. 6) of the dough plenum 90 by flowing around the ends of the central member 98. The resultant frictional forces acting upon the dough would tend to make the dough flow more slowly out of the right-hand side of the dough plenum 90 than out of the left-hand side thereof, thus producing a non-uniform sheet of extruded dough and fat.

In practice, since the "end effects" which tend to slow the rate of extrusion from the end portions of the orifices only extend a short way in from the extreme ends of the orifices, it will usually only be necessary to increase the speed of the last one auger at each end of each set i.e. augers 42-2 to 42-8 and 52-2 to 53-8 can normally all be driven at the same speed. This considerably simplifies the construction of the apparatus, since (apart from the provision of reversing gears to ensure that all the augers in the set are rotated in the same direction) all the gear trains can be identical, with the necessary difference in speed between the augers 42-1, 42-9, 52-1, and 52-9 and the remaining augers in each set being provided by adjusting the speeds of the motors 56A-C and 58A-C, as already described.

If it is desired that the two augers adjacent each end of each set (i.e. the augers 42-1, 42-2, 42-8, 42-9, 52-1, 52-2, 52-8, and 52-9) be driven at speeds different from the remaining augers in each set, conveniently the motor 56A is arranged to drive augers 42-1 and 42-2, the motor 56B to drive augers 42-3 to 42-7, the motor 56C to drive augers 42-8, and 42-9, the motor 58A to drive augers 52-1 and 52-2, the motor 58B to drive augers 52-3 to 52-7 and the motors 58C to drive augers 52-8 and 52-9. However, in this case, since it will usually be necessary to drive the augers 42-2, 42-8, 52-2, and 52-8 at a speed intermediate the speeds of the augers 42-1, 42-9, 52-1, and 52-9 and the augers 42-3 to 42-7 and 52-3 to 52-7 (because of the way in which the frictional forces acting on the fat and dough vary along the length of the orifices 102 and 104) in this case at a minimum the gear trains associated with augers 42-1, 42-9, 52-1 and 52-9 will need to differ from those associated with the augers 42-2, 42-8, 52-2 and 52-8.

The optimum speed ratio between the augers at the extreme ends of the die 44 and those in the center portion of the die will vary with a large number of factors, including the exact size and shape of the orifices and the physical properties of the dough and the fat being employed. However, in general it will be found that the augers at the extreme ends of the die should rotate at a speed 10 to 20 percent greater than the augers in the center portions of the die, in the case of the augers driving the dough. Because of the lower viscosity of the fat, a smaller speed differential will normally be used in the fat augers. If two augers adjacent the end of each row are to be driven at a different speed from the remaining augers in each row, the second auger from the end of each dough (i.e. augers 42-2, 42-8, 52-2 and 52-8 in FIG. 2) should be driven at a speed which is intermediate that of the augers at the extreme end of each row and those in the center portion of each row. Typically, the speed differential between, for example, auger 42-2 and augers 42-3 to 42-7 will be half the speed differential between auger 42-1 and augers 42-3 to 42-7. As will be apparent to those skilled in the art, the optimum speed ratio for the various augers can easily be determined, for any specific application, by routine empirical tests.

Figure 8:
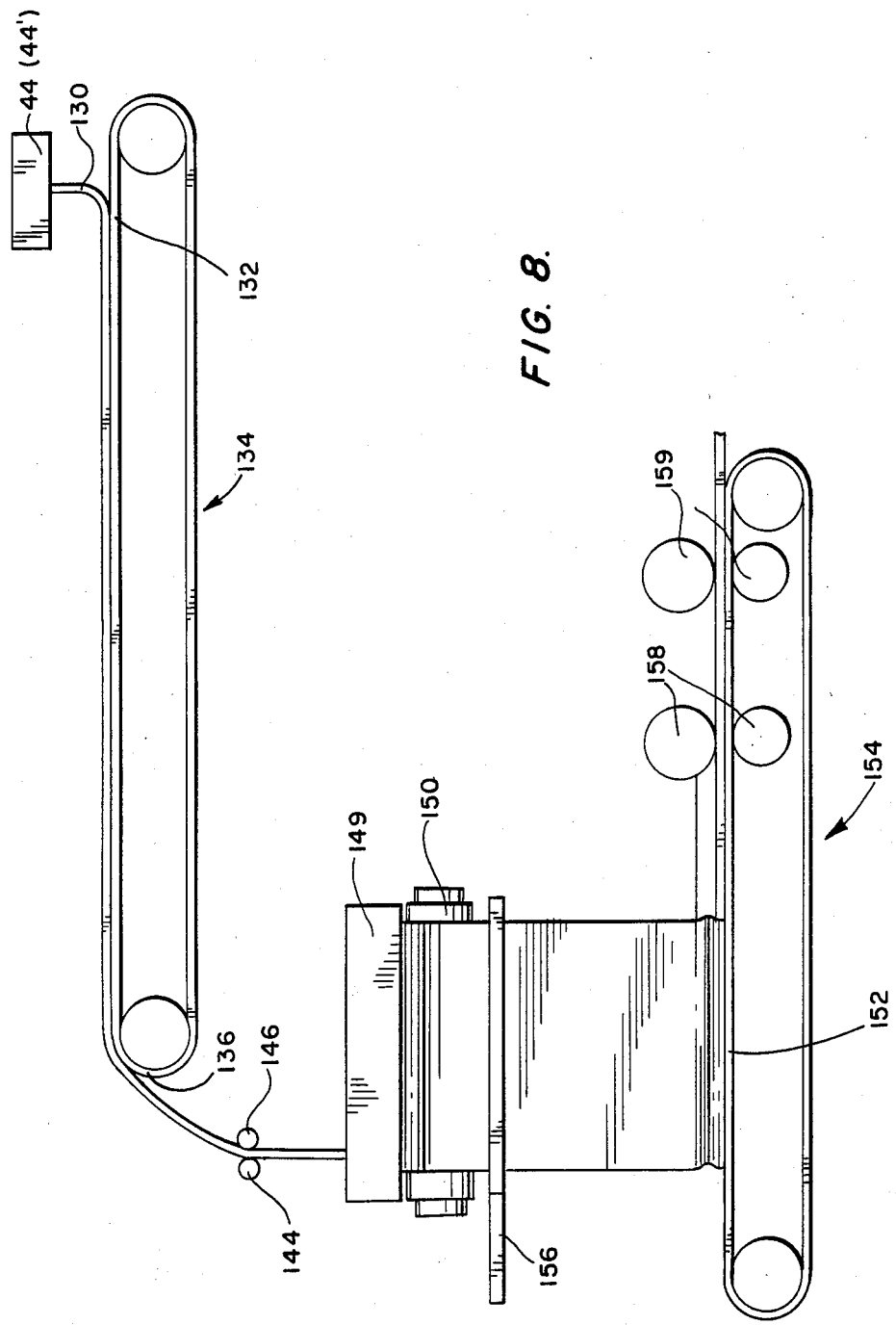
FIG. 8 is a side elevation of the lamination and rolling apparatus used in conjunction with the apparatus shown in FIGS. 1-3.

After the coextruded sheet has been produced by apparatus as shown in FIGS. 1–7, the coextruded sheet may be laminated and subjected to other operations to prepare puff pastry and similar products. Appropriate lamination apparatus is shown in FIGS. 8 and 9. As shown in FIG. 8, the coextruded sheet of fat and dough 130 emerging downwardly from the die 44 is received on to an intake section 132 of an endless belt conveyor 134. The conveyor 134 carries the sheet 130 to an outlet end 136, where the sheet 130 leaves the conveyor 134 and passes downwardly on to the intake section 138 of a second endless belt conveyor 140 running horizontally but at right angles to the conveyor 134. As the sheet 130 passes downwardly to the conveyor 140, it comes into contact with a sheet guide 142, which is substantially Y-shaped having two parallel arms 144 and 146. These arms 144 and 146 are disposed between the outlet end 136 of the conveyor 144 and the intake section 138 of the second conveyor 140. The sheet guide 142 is arranged to oscilate horizontally and transversely across the conveyor 140, as indicated by the double arrow A in FIG. 9. As the arms 144 and 146 of the sheet guide 142 contact the falling sheet 130, they guide the sheet so that it oscillates transversely across the conveyor 140, thereby depositing multiple plies of the sheet 130 on to the conveyor 140. As will be apparent to those skilled in the art, the number of plies of the sheet 130 which will be deposited upon the conveyor 140 will be determined by the amplitude and frequency of oscillation of the sheet guide 142 and by the speed of the conveyor 140.

The conveyor 140 carries the multiple plies of the sheet 130 deposited thereon to two pairs of pinch rolls 148 and 149 respectively, only the upper one of each pair of rolls being visible in FIG. 8. These pinch rolls 148 and 149 serve to compress the loosely-laid multiple plies of the sheet 30 on the conveyor 140 into a compact multi-layer sheet, which will typically be of approximately the same thickness as the original single sheet 130 when coextended from the die 44. The combined effect of the pinch rolls 148 and 149 is to reduce the multiple plies of the sheet 30 to, typically, one-third of their original thickness. The multi-layer sheet produced on the conveyor 140 by the pinch rolls 148 and 149 is carried to an outlet end 150 of the conveyor 140, whence it falls downwardly on to an intake section 152 of a further conveyor 154, which is traveling horizontally in a direction normal to the direction of travel of the conveyor 140 and opposite to that of the conveyor 134. As it falls from the conveyor 140 to the conveyor 154, the sheet comes into contact with a sheet guide 156 identical to the sheet guide 142 described above. The sheet guide 156 oscillates transversely across the conveyor 154, as indicated by the double arrow B in FIG. 9. Thus, the sheet guide 156 causes multiple plies of the multi-layered sheet to be deposited upon the conveyor 154. These multiple plies on the conveyor 154 are rolled by pinch rolls 158 and 159. These pinch rolls 158 and 159 will typically reduce the thickness of the multiple plies on the conveyor 154 by a factor of about eight. The resultant multiple-layer may than be subjected to conventional cutting and forming operations, which will be familiar to those skilled in the art and need not be described further, in order to prepare the final product.

Although the apparatus and process of the present invention may be useful in the production of puff pastry, the specific apparatus and process just described would probably required modification (e.g. by the addition of further laminating and rolling stages) to produce the very large number of dough layers required in high quality puff pastry. However, it is believed that the apparatus and process of the present invention, and in particular the specific apparatus and process just described, are eminently suitable for providing a very high quality cracker having many more laminations, and hence a more flaky texture, than conventional crackers. Such crackers having many more laminations than conventional crackers should command premium prices.

It will be apparent to those skilled in the art that numerous changes and modifications can be made in the preferred embodiments of the invention described above without departing from the scope of the invention. Accordingly, the whole of the foregoing description is to be construed in an illustrative and not in a limitative sense, the scope of the invention being defined solely by the appended claims.

I claim:

1. Apparatus for coextruding a fat and a dough to produce an extruded sheet comprising a layer of the fat sandwiched between two layers of the dough, the apparatus comprising:

a die member having walls defining a first outlet orifice having the form of an elongate slot through which the fat can be extruded, a second outlet orifice in the form of an elongate slot surrounding the first outlet orifice and through which the dough can be extruded, and a supply conduit communicating with the second outlet orifice and through which dough can be fed to the second outlet orifice;

at least first, second and third drive means disposed in the supply conduit for driving the dough along the supply conduit and through the second outlet orifice, the first and third drive means being arranged to drive the dough through the two opposed end portions of the second outlet orifice, and the second drive means being arranged to drive the dough through the center portion of the second outlet orifice; and control means for controlling the operation of the drive means, the control means being arranged such as to operate the first and third drive means at a faster rate than the second drive means, such that the dough passes through the end portions of the second outlet orifice at substantially the same rate as it passes through the center portion thereof.

2. Apparatus according to claim 1 wherein the first outlet orifice has a length of at least about ten times its width and the second outlet orifice has a length of at least about five times its width.

3. Apparatus according to claim 2 wherein the first outlet orifice has a width in the range of from about 2 to about 10 mm. and a length of at least about 200 mm., and the second outlet orifice has a width in the range of about 6 to about 30 mm. and a length in excess of 200 mm. and at least 6 mm. greater than the length of the first outlet orifice.

4. Apparatus according to claim 1 wherein the walls of the die member defining the first outlet orifice projectly outwardly through the plane of the second outlet so that the first and second outlet orifices lie in substantially parallel planes but with the first outlet orifice lying outwardly of the second outlet orifice.

5. Apparatus according to claim 1 wherein an opposed pair of walls of the die member defining the portion of the supply conduit adjacent the second outlet orifice are inclined towards one another so that the portion of the supply conduit adjacent the second outlet orifice has substantially the form of a frustum of an isosceles triangular prism, the axis of this prism lying substantially parallel to the length of the second outlet orifice.

6. Apparatus according to claim 1 wherein the first, second and third drive means comprise at least three augers mounted side-by-side in the supply conduit with their axes directed along the supply conduit.

7. Apparatus according to claim 6 wherein the section of the supply conduit in which the augers are mounted comprises at least three substantially parallel bores having axes perpendicular to the length of the second outlet orifice, and each bore has an auger mounted axially therein.

8. Apparatus according to claim 1 further comprising a second supply conduit communicating the the first outlet orifice and an auxiliary drive means disposed in the second supply conduit for driving fat along the second supply conduit and through the first outlet orifice.

9. Apparatus according to claim 8 having at least first, second and third auxiliary drive means, the first and third auxiliary drive means being arranged to drive the fat through the two opposed end portions of the first outlet orifice while the second auxiliary drive means is arranged to drive the fat through the center portion of the first outlet orifice, and wherein the control means being such as to operate the first and third auxiliary drive means at a faster rate than the second auxiliary drive means, such that the fat passes through the end portions of the first outlet orifice at substantially the same rate as it passes through the center portion thereof.

10. Apparatus according to claim 9 wherein the first, second and third auxiliary drive means comprise a plurality of augers mounted side-by-side in the second supply conduit with their axes directly along the second supply conduit.

11. Apparatus according to claim 1 further comprising laminating means for laminating the sheet of dough and fat which will issue from the die member.

12. Apparatus according to claim 11 wherein the laminating means comprises:

a first conveyor having an intake section disposed adjacent the die member for receiving the sheet of fat and dough which will issue from the die member, and an outlet end, the first conveyor being arranged to transport the sheet from its intake section to its outlet end;

a second conveyor having an intake section disposed beneath the outlet end of the first conveyor such that the sheet leaving the outlet end of the first conveyor will fall on to the intake section of the second conveyor, the second conveyor being arranged to transport the sheet in a direction substantially normal to the direction of travel of the first conveyor; and a sheet guide disposed between the outlet end of the first conveyor and the intake section of the second conveyor and arranged to oscillate transversely across the second conveyor, the sheet guide being arranged to guide the sheet of fat and dough falling from the outlet end of the first conveyor to the intake section of the second conveyor so that as the sheet guide oscillates the sheet will oscillate transversely across the second conveyor. thereby depositing multiple plies of the sheet on the second conveyor.

13. Apparatus according to claim 12 further comprising at least one pair of pinch rolls disposed on opposed sides of the second conveyor and arranged to roll, and thereby reduce the thickness of, the multiple plies of the sheet on the second conveyor.

14. A process for coextruding a fat and a dough to produce an extruded sheet comprising a layer of fat sandwiched between two layers of the dough, which process comprises:

feeding the fat through a die member, the die member having walls defining a first outlet orifice having the form of an elongate slot, and a second outlet orifice in the form of an elongate slot surrounding the first outlet orifice, the fat being fed through the first outlet orifice, the die member also having walls defining a supply conduit communicating with the second outlet orifice, and at least first, second and third drive means disposed in the supply conduit, the first and third drive means being arranged to drive material through the two opposed end portions of the second outlet orifice while the second drive means is arranged to drive material through the center portion of the second outlet orifice; and simultaneously feeding the dough through the second outlet orifice of the die member by operating the first, second and third drive means with the first and third drive means being operated at a faster rate than the second drive means in such a manner that the dough passes through the two end portions of the second outlet orifice at substantially the same rate as it passes through the center portion thereof.

15. A process according to claim 14 wherein the first, second and third drive means comprise at least three augers mounted side-by-side in the supply conduit with their axes directed along the supply conduit, and the augers forming the first and third drive means rotate at a rate at least about 10 percent greater than the auger forming the second drive means.

16. A process according to claim 14 wherein the die member has walls defining a second supply conduit communicating with the first outlet orifice and wherein the fat is driven along the second supply conduit and through the first outlet orifice by at least first, second and third auxiliary drive means disposed in the second supply conduit, the first and third auxiliary drive means being arranged to drive the fat through the two opposed end portions of the first outlet orifice while the second auxiliary drive means is arranged to drive the fat through the center portion of the first outlet orifice, and wherein the first and third auxiliary drive means are operated at a faster rate than the second auxiliary drive means, such that the fat passes through the end portions of the first outlet orifice at substantially the same rate as it passes through the center portion thereof.

17. A process according to claim 14 wherein the sheet of fat and dough is laminated after it leaves the die member.

18. A process according to claim 17 wherein the sheet of fat and dough leaving the die member is received onto a first conveyor and is conveyed by the first conveyor to an outlet end thereof;
- upon reaching the outlet end of the first conveyor, the sheet falls onto a second conveyor disposed below the outlet end of the first conveyor and travelling in a direction substantially normal to the direction of travel of the first conveyor; and
- as the sheet falls from the outlet end of the first conveyor to the second conveyor, the sheet is contacted by a sheet guide oscillating transversely across the second conveyor, so that the sheet oscillates transversely across the second conveyor and multiple plies of the sheet are deposited on the second conveyor.

19. A process according to claim 18 wherein the multiple plies of the sheet on the second conveyor are passed between at least one pair of pinch rolls disposed on opposed sides of the second conveyor, thereby reducing in thickness of the multiple plies of the sheet.

20. A process according to claim 14 wherein the thickness of the fat layer in the sheet produced is from about 0.6 to about 1.0 times the thickness of each of the dough layers in the sheet.

* * * * *